United States Patent Office 3,657,182
Patented Apr. 18, 1972

3,657,182
COMPOSITIONS AND A PROCESS FOR PREPARING WATER DISPERSIBLE POLYMERS
Colin S. Jolly, Burlington, Ontario, Canada, assignor to Alchem Limited, Burlington, Ontario, Canada
No Drawing. Filed Jan. 29, 1971, Ser. No. 111,101
Int. Cl. C09d 5/02
U.S. Cl. 260—33.4 R
14 Claims

ABSTRACT OF THE DISCLOSURE

Compositions of finely divided solid, water-soluble, polymers of high molecular weight uniformly coated with a surfactant and mixed with anhydrous sodium sulfate are readily dispersed in water. A method for improving the water dispersibility of a finely divided, solid, water-soluble polymer is disclosed.

INTRODUCTION

Water-soluble high molecular weight polymers, of which acrylamide polymers is a common species, are conventionally utilized in the form of dilute aqueous solutions. Although the polymers as manufactured can be dispersed in water to provide homogeneous solutions, care must be exercised in achieving an initial dispersion of the polymer in water. Unless proper precautions are taken, the polymer is likely to agglomerate upon wetting with water to form partially hydrated agglomerated polymer which is slow to dissolve. Moreover, the agglomerated polymer has a tendency to plug liquid handling equipment. Although complete dissolution of the agglomerated polymer is possible its achievement may require extended periods of time or special treatments to promote rapid dissolution of the gels. Removal of the agglomerated polymer from solutions is also an alternative but is wasteful of polymer.

It is an object of this invention to provide a polymer that is more readily dispersed in water, thereby obviating the need for special handling techniques.

A further object is to provide a novel process for the preparation of improved polymers.

These objects and other benefits which will become apparent hereinafter as the invention is more fully described.

THE INVENTION

Water-soluble high molecular weight polymers having improved water dispersibility are obtained by: (1) uniformly coating the finely divided solid polymers with from 0.01 to 2.5% by weight of a suitable surfactant and from 0 to 5% of a polyhydric alcohol selected from the group consisting of ethylene glycol, propylene glycol, dipropylene glycol, polypropylene glycol, glycol and alcohols having from 1-8 carbon atoms; (2) mixing intimately from 5 to 90% by weight of sodium sulfate; and (3) incorporating from 0 to 2.5% of an antifoam and from 0 to 5.0% of a corrosion inhibitor. The polyhydric alcohol, the antifoam and the corrosion inhibitor are optional and are not necessary in all cases to practice the subject matter of this invention.

The surfactant can be anionic, cationic, or nonionic. Examples of suitable anionic surfactants are alkali metal, ammonium, and amine soaps; the fatty acid part of such soaps contain preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfo-succinate, sulfated or sulfonated oils, e.g., sulfated castor oil; sulfonated tallow, and alkali salts of short chain petroleum sulfonic acids.

Examples of suitable cationic surfactants are salts of long chain primary, secondary, or tertiary amines, such as, oleylamine acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl didodecyl ammonium chloride.

The proper surfactant depends on the other ingredients in the composition. One skilled in the art would be able to select the proper surfactant.

Examples of suitable nonionic surfactants are condensation products of higher fatty alcohols with ethylene oxide, such as the reaction product oleyl alcohol with 10 ethylene oxide units; condensation products of alkylphenols with ethylene oxide, such as the reaction product of isooctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). A combination of two or more of these surfactants may be used.

The actual surfactant and the amount of the surfactant needed depends upon the physical characteristics of each polymer and the amount of dispersibility desired. Preferably, the surfactant is sodium dioctyl sulfo-succinate. Optimum coating can be achieved by using a diluent such as isopropanol, methanol, or other diluents. The ratio of surfactant to diluent can vary from 10:90 to 90:10. Preferably, this ratio of surfactant to diluent ranges from 90:10 to 75:25. The ratio can be adjusted to give the best coating of the polymer.

Lastly, from 5 to 90% of anhydrous sodium sulfate is incorporated in the formulation to aid the total dispersion in the final solution by physically separating the coated polymer particles. The sodium sulfate aids the dispersion of the polymer and minimizes or prevents any agglomerates from forming. The sodium sulfate and the corrosion inhibitor are intimately mixed with the coated polymers. This forms the composition of the invention and is readily dispersed in water.

Very dry, dusty or fine polymers can be formulated by pretreating with a polyhydric alcohol. This pretreatment is not always necessary but if used, can range up to 5% by weight of the final formulation.

An antifoam such as a dimethyl silicone fluid can be added. Such antifoams are known to the art and are readily available commercially. Any antifoam could be used that is compatible with the other ingredients in the formulation. An emulsified antifoam could also be used.

A corrosion inhibitor such as sodium tripolyphosphate can be added to the formulation. Any sodium phosphate could be used. Preferably any corrosion inhibitor could be used. The corrosion inhibitor acts to prevent corrosion of the feeding and dissolving equipment by the sodium sulfate, polymers or any other ingredient in the formulation.

The polymers of this invention are prepared from water-soluble monomers. To make high molecular weight water-soluble polymers, any known water-soluble ethylenically-unsaturated monomers may be polymerized and such water-soluble high molecular weight polymers may be used in this invention. Such monomers include acrylamide, methacrylamide, dimethylaminoethyl methacrylate, acrylic acid and methacrylic acid, as well as the water-soluble salts thereof, carboxyethyl acrylate or salts thereof, acrylonitrile, methacrylonitrile, lower alkyl esters and alkyl ether of the acrylic acids, vinyl alkyl ethers, the polycarboxylic acids such as maleic, fumaric, itaconic, aconitic, citraconic acid, etc., which may be polymerized alone or polymerized with the amides of these acids, the alkali metal derivatives (e.g., sodium, potassium, and lithium), the alkaline earth metal derivatives (e.g., magnesium, calcium, barium, and strontium), and ammonium salts of these acids and the like. Any of these monomers may be polymerized alone or in combination with other monomers to achieve water-soluble polymers having a molecular weight of at least 500,000 and up to 12,000,000, and an average particle diameter of from 1 to 1000 microns. Especially preferred are acrylamide, acrylic acid and its salts, and mixtures of acrylamide and acrylic monomers. Techniques for preparing these polymers are known to those skilled in the art.

The method of this invention for preparing the water dispersible polymers comprises the steps of:

(1) Coating the water-soluble polymer with from 0 to 5% by weight of a polyhydric alcohol. This step is optional and can be eliminated if the particles are not very fine and/or dry.

(2) Applying a coat of from 0.01 to 2.5% of a suitable surfactant which could be anionic, cationic, or nonionic. Preferably this surfactant is sodium dioctyl sulfo-succinate.

(3) Adding from 0 to 2.5% of an antifoam.

(4) Intimately mixing 0 to 5.0% of a corrosion inhibitor. The corrosion inhibitor and the antifoam are optional and could be eliminated. But it has been found preferable to control the foam and also to prevent any corrosion that may result from the presence of the sodium sulfate, polymer or any other ingredient in the formulation.

(5) Intimately mixing from 5 to 90% by weight of sodium sulfate. The sodium sulfate acts to partition the coated polymer particles from each other helping to prevent agglomeration.

A coating is applied to the polymer by blending the polyhydric alcohol and/or the surfactant with the polymer. The blending must consist of a thorough mixing in order to uniformly and substantially coat the polymer particles. Preferably, ethylene glycol is the polyhydric alcohol but other materials such as propylene glycol, dipropylene glycol, polypropylene glycol, glycerol, and other hydroxy containing alcohols could be used. It should be understood that variations in these steps can occur without substantially departing from the invention. For example, the sodium sulfate could be coated with the polyhydric alcohol instead of coating the polymer.

The sodium sulfate also reduces the viscosity of the resulting polymer solutions in the majority of cases.

Preferably the surfactant is sodium dioctyl sulfo-succinate, the corrosion inhibitor is sodium tripolyphosphate, and the antifoam is dimethyl silicone fluid.

Another advantage of this invention is that it permits the polymers to be packaged in water-soluble bags such as polyvinyl alcohol bags for easy use and handling. The package and contents may then be dropped into dissolving tanks. The bag dissolves as well as the contents. It has been found that the polyvinyl alcohol has little or no effect on the polymers' performance.

Following are the dispersion test.

DISPERSION TESTS

Four hundred milliliters of cold tap water contained in a 600 milliliter beaker is agitated with a three-blade stainless steel stirrer at slow speeds. Approximately 8 grams of the modified polymer (equivalent to 1% of unmodified polymer) as added to the agitated water by throwing in the whole amount at one time. The modified polymer is observed for any formation of lumps and the rate at which it dissolves.

The final product showed excellent dispersion characteristics upon being added to water using the dispersion test. There were no lumps and the polymer dissolved in the water at a normal rate.

COMPARISON CHEMICALS

Various dry chemicals were tried in an attempt to disperse the polymers in water. These include aluminum sulfate, citric acid, potassium chloride, starches, both corn and potato, sodium chloride, sodium bicarbonate, sodium carbonate, sodium aluminate, sodium borates, sodium phosphates (including mono, di, tri, tripoly, acid pyro, hexameta, septa), sodium bisulfate and sodium sulfate. Sodium sulfate gave the best performance both as a dispersant and providing a reduction in the viscosity of the polymer solutions in the majority of cases while not appreciably affecting the performance of the polymer.

Surface active agents, glycols, and other liquids were blended with the polymers to again attempt dispersion of the polymer in water. None of these by itself was too effective although some dispersion was noted.

Two preferred formulations were prepared and tested. These formulations, D-16 and D-17, are listed below.

FORMULATIONS

| Ingredients in percent by weight | D-16 | D-17 |
|---|---|---|
| Acrylamide polymer [1] | 48.5 | 47.0 |
| Ethylene glycol | 1.0 | 3.0 |
| Sodium dioctyl sulfo-succinate [2] | 0.5 | 1.0 |
| Dimethyl silicone fluid | 0.5 | 1.0 |
| Sodium tripolyphosphate | 1.0 | 1.0 |
| Sodium sulfate | 48.5 | 47.0 |

[1] The acrylamide polymer had an average molecular weight of about 7,000,000.
[2] This was the surfactant used and was diluted with isopropanol to a ratio of 90:10 surfactant to isopropanol.

PERFORMANCE TESTS

Performance tests were run on the modified polymers D-16 and D-17 to compare with the unmodified polymers D-6 and D-3. Retention and drainage aid evaluations were made on a pulp slurry described below using the test procedure outlined in the following paragraphs.

The stock was prepared according to the following procedure:

Alum-clay filled pulp (a) bleached sulfite pulp lap 45% (bleached sulfite)
(b) kraft 45%, bentonite clay 200 mesh 10%

(1) 6.8 grams of pulp (a) was blended in 500 milliliters of Burlington tap water for five minutes on high speed using a Waring Blendor.

(2) The above was repeated for pulp (b) with the bentonite clay being added for the last 30 seconds of mixing. The pulps are mixed together in a 4,000 milliliter beaker and diluted to 3,500 milliliters with Burlington tap water and the pH adjusted to 4.5 with alum.

The retention aid evaluation involves the filtration on an 80 mesh wire screen and through a forming pad of pulp. Retention ability is measured by the filtrate clarity.

The procedure used is as follows: A graduated open ended cylinder is fitted with an 80 mesh wire screen ½"

in from the bottom end. The maximum capacity of the cylinder is 560 ml. (measured from the screen to the zero mark). The cylinder is stoppered at the bottom and filled with the prepared stock to the zero mark. Treatment chemicals are then added to the cylinder at this point. The cylinder is stoppered at the top and inverted 10 times. The bottom stopper is removed, then the top stopper, collecting the first 300 ml. of filtrate in a beaker.

Using a turbidimeter the amount of turbidity in the 300 ml. of filtrate is measured as p.p.m. $SiO_2$ for the retention ability of the chemical being tested.

The stock preparation, charging and chemical addition procedures described above for retention aid evaluation are used for the drainage aid evaluation. However, instead of being concerned with the filtrate clarity, the rate of water passage out of the cylinder is measured. In this case the filtration rate is measured in the number of seconds required to drain the first 300 ml. of filtrate from the cylinder.

The two solutions of D-16 and D-17 were made up in distilled water with the addition of vinyl polyvinyl alcohol film at the level of 43 square inches per pound of D-16 or D-17. The polyvinyl alcohol film was included in the solutions to check the effect, if any, on the performance of the polymers. Final dilutions of the polymers from the make up solutions of 0.5% D-6 or D-3 and 2% D-16 or D-17 were made just before each test giving a minimum molecular uncoil time. Final dilution strength of polymer solutions were 0.05% based on the active polymer. An equivalent of one-half pound of the active polymer per ton of paper was added for each test. Test results were as follows.

TIME AND TURBIDITY ON FIRST 300 MILLILITERS

| Treatment | Time at— Minutes | Seconds | Turbidity as p.p.m. $SiO_2$ |
|---|---|---|---|
| Control 1 | 1 | 35 | 18 |
| Control 2 | 1 | 45 | 19 |
| D-6 | 1 | 3 | 5 |
| D-16 plus PVA | 1 | 3 | 4 |
| D-3 | 1 | 20 | 5 |
| D-17 plus PVA | 1 | 19 | 5 |

As demonstrated in the above test results, the inclusion of the antifoam, sodium sulfate, sodium tripolyphosphate, ethylene glycol, and polyvinyl alcohol have little or no effect on the performance of D-16 or D-17.

SUMMARY

Therefore, in summary, a new composition of matter is disclosed which comprises coating a water-soluble polymer with a surfactant and incorporating sodium sulfate to readily disperse the polymer. A stepwise process for improving the water dispersibility of finely divided, solid, water-soluble polymers is set forth. Antifoams and corrosion inhibitors can be incorporated in the formulation.

The embodiments of the invention in which an exclusive property or privilege is claimed are defined as follows:

1. A composition of matter comprising, by weight, of:
   (A) from 10 to 95% of a finely divided, solid, water-soluble polymer of molecular weight of from 500,000 to 12,000,000 and a particle size of from 1 to 1000 microns, having a uniform coating of from 0 to 5% of polyhydric alcohol selected from the group consisting of ethylene glycol, propylene glycol, dipropylene glycol, polypropylene glycol, glycerol and alcohols having from 1–8 carbon atoms, and from 0.01 to 2.5% of a suitable surfactant;
   (B) from 5 to 90% of anhydrous sodium sulfate;
   (C) from 0 to 2.5% of an antiform; and
   (D) from 0 to 5% of a corrosion inhibitor.

2. The composition of claim 1 in which the corrosion inhibitor is sodium tripolyphosphate.

3. The composition of claim 1 in which the surfactant is sodium dioctyl sulfo-succinate.

4. The composition of claim 1 in which the surfactant is diluted with a diluent in a ratio of surfactant to isopropanol of from 90:10 to 10:90, before being applied as a coating to the polymer.

5. The composition of claim 4 in which the diluent is isopropanol.

6. The composition of claim 1 in which the antifoam is a dimethyl silicone fluid.

7. The composition of claim 1 in which the water-soluble polymer is an acrylamide polymer.

8. The composition of claim 1 in which the amounts of the ingredients are:
   (A) 48.5% acrylamide polymer having a uniform coating of 1.0% ethylene glycol and 0.5% of a sodium dioctyl sulfo-succinate diluted with a diluent in a ratio of 90:10, respectively;
   (B) 0.5% of a dimethyl silicone fluid;
   (C) 1.0% of sodium tripolyphosphate; and
   (D) 48.5% of sodium sulfate.

9. The composition of claim 1 in which the amounts of the ingredients are:
   (A) 47.0% acrylamide polymer having a uniform coating of 3.0% ethylene glycol and 1.0% of sodium dioctyl sulfo-succinate diluted with a diluent in a ratio of 90:10, respectively;
   (B) 1.0% of a dimethyl silicone fluid;
   (C) 1.0% of sodium tripolyphosphate; and
   (D) 47.0% of sodium sulfate.

10. A method for improving the water dispersibility of a finely divided, solid, water-soluble polymer having a molecular weight of from 500,000 to 12,000,000 which comprises the steps of:
    (A) coating the water-soluble polymer with from 0 to 5% by weight of polyhydric alcohol selected from the group consisting of ethylene glycol, propylene glycol, dipropylene glycol, polypropylene glycol, glycerol and alcohols having from 1–8 carbon atoms;
    (B) applying a coat of from 0.01 to 2.5% of a suitable surfactant;
    (C) adding from 0 to 2.5% of an antifoam; and
    (D) mixing intimately from 0 to 5% of a corrosion inhibitor and from 5 to 90% of sodium sulfate.

11. The method of claim 10 in which the surfactant is sodium dioctyl sulfo-succinate.

12. The method of claim 10 in which the corrosion inhibitor is sodium tripolyphosphate.

13. The method of claim 10 in which the antifoam is dimethyl silicone fluid.

14. The method of claim 10 in which the diluent is isopropanol.

References Cited

UNITED STATES PATENTS

| 2,799,662 | 7/1957 | Ernst | 260—29.6 PM |
| 3,137,668 | 6/1964 | Kuppers | 260—29.6 SQ |
| 3,163,619 | 12/1964 | Sheats | 260—29.6 E |

MORRIS LIEBMAN, Primary Examiner

P. R. MICHL, Assistant Examiner

U.S. Cl. X.R.

117—100 C; 252—385; 260—29.6 SQ, 29.6 PM, 29.6 E

UNITED STATES PATENT OFFICE
CERTIFICATE OF CORRECTION

Patent No. 3,657,182          Dated April 18, 1972

Inventor(s) Colin S. Jolly

It is certified that error appears in the above-identified patent and that said Letters Patent are hereby corrected as shown below:

Column 2, line 15, after "product" insert --of--.
Column 4, line 5, for "test" read -- tests --.
Column 6, line 2, for "antiform" read -- antifoam --.

Signed and sealed this 8th day of August 1972.

(SEAL)
Attest:

EDWARD M. FLETCHER, JR.          ROBERT GOTTSCHALK
Attesting Officer                Commissioner of Patents